Nov. 22, 1960   J. N. EDIS   2,961,086
APPARATUS FOR HANDLING BISCUITS AND THE LIKE
Filed Nov. 12, 1957   3 Sheets-Sheet 1

INVENTOR.
John N. Edis
By
Watson, Cole, Grindle & Watson
Attorneys

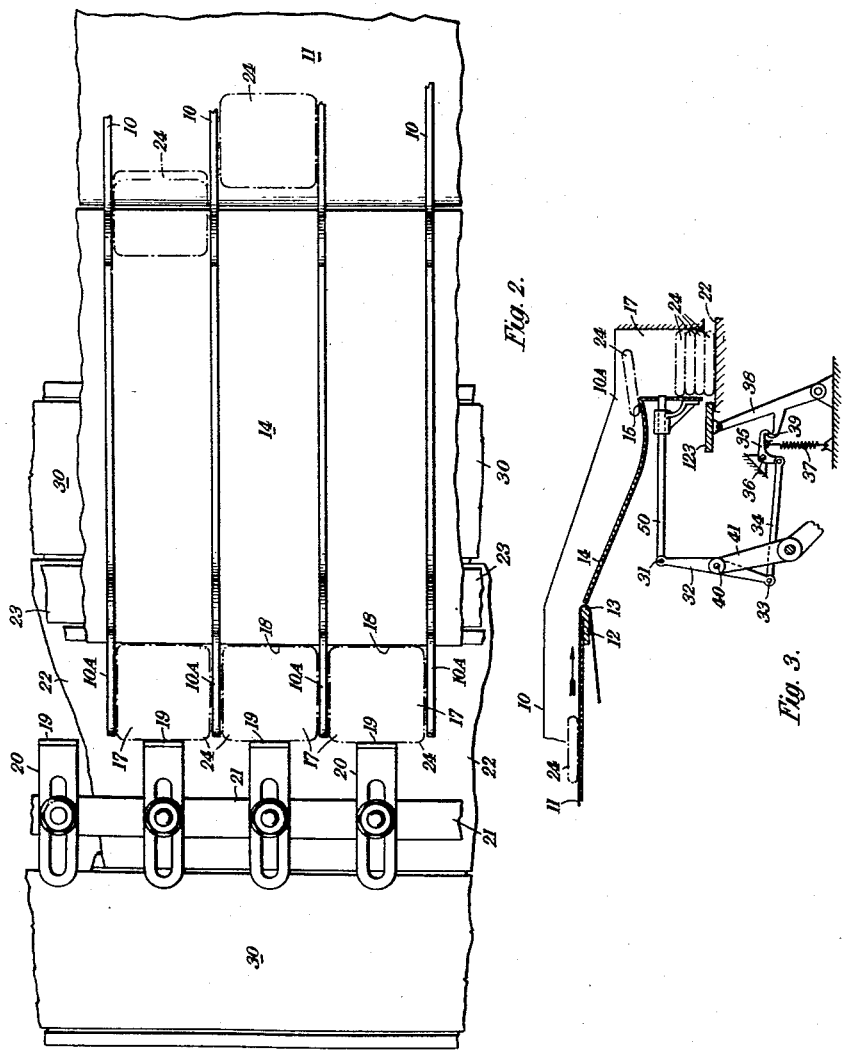

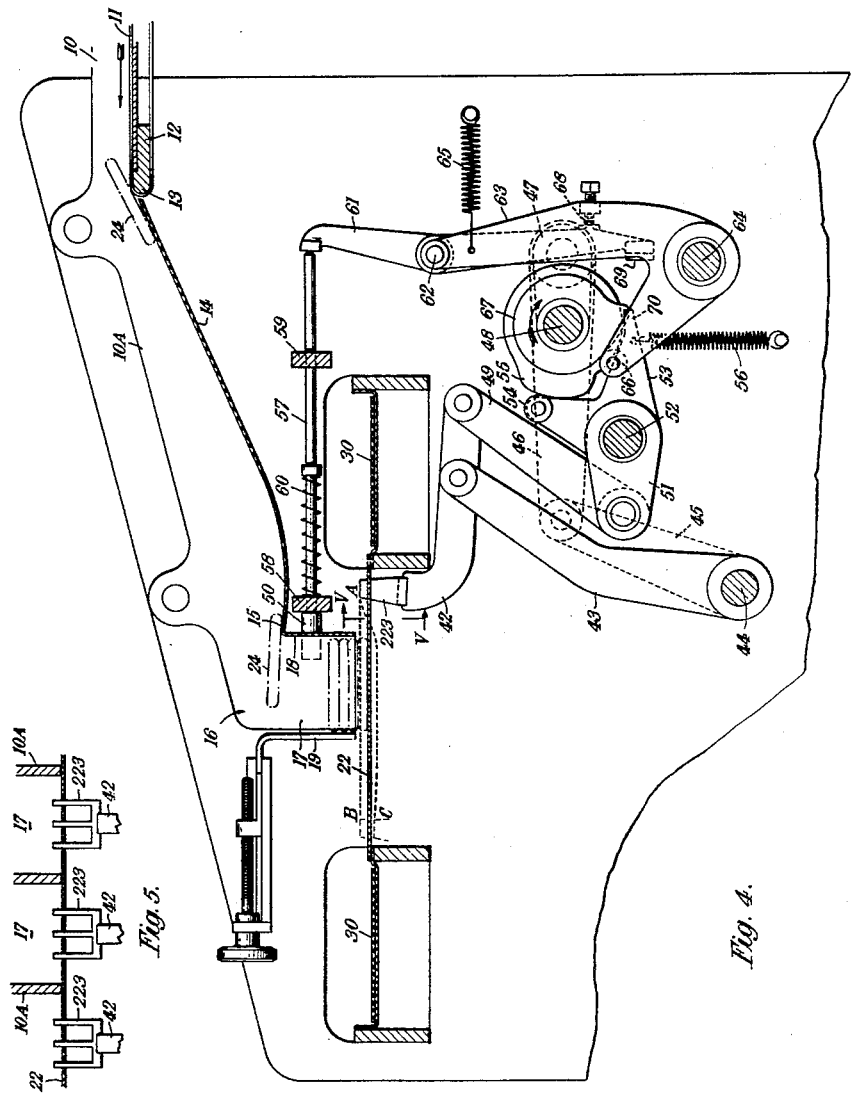

United States Patent Office 2,961,086
Patented Nov. 22, 1960

2,961,086

APPARATUS FOR HANDLING BISCUITS AND THE LIKE

John Neville Edis, Leeds, England, assignor to The Forgrove Machinery Company, Limited, Leeds, England, a company of Great Britain Filed Nov. 12, 1957, Ser. No. 695,840

Claims priority, application Great Britain Nov. 19, 1956

6 Claims. (Cl. 198—32)

This invention relates to the handling of biscuits or the like. In an automatic baking plant, biscuits are produced in a number of longitudinal rows and require to be conveyed to further machines, such for example as chocolate coating or sandwiching machines or wrapping machines, situated at a remote point in the factory. The cooling band of an automatic baking plant is, however, of considerable width, e.g. 36 inches, and it is not convenient to extend so wide a band to remote parts of the factory. The object of this invention is to condense a number of longitudinal rows of biscuits or the like into a predetermined smaller number of rows, so permitting the biscuits delivered by an automatic baking plant to be conveyed to a remote machine by one or more narrow conveyors. Narrow conveyors can be more easily supported than a wide conveyor and their use enables corners to be more easily negotiated.

The biscuits lying flat on the cooling conveyor of a baking plant normally lose their alignment and the existing practice is to "row-up" the biscuits by dropping the biscuits off a terminal roller of the cooling band and on to a downwardly sloping chute having a number of guides positioned so that the biscuits will fall into channels defined by the guides. Thereafter the biscuits are kept between the guides, which run substantially parallel to their line of motion. At the bottom of the "rowing-up" chute they are collected by a band which takes them to a second chute, at the bottom of which is a stacking mechanism, usually of the rotary paddle type, which stacks the biscuits on their edges and propels them forwards over a short dead plate, after which they are driven along at slow speed on the packing conveyor. From this conveyor, operators normally pick the biscuits out for packing as required.

It has been proposed to deliver each stack of biscuits automatically by means of a curved chute, in which the biscuits stand on edge, to a hopper in which the biscuits lie flat on their faces and to deliver the bottom biscuits from the hoppers to one or more conveyors, each of which carries a single row of biscuits to a further machine. This procedure, however, leads to complications in operation and it is difficult at the start of a production shift to ensure that the leading biscuits keep in good order, particularly on the descending portions of the curved chutes. Complicated and expensive control mechanisms are therefore needed to ensure successful filling of the apparatus at the start of a shift. The present invention achieves condensation of the biscuits to fewer rows without resorting to stacking of the biscuits and with the biscuits lying flat throughout the operation and thus avoids considerable complication.

The invention provides a method of condensing to fewer rows biscuits or similar thin articles lying flat in a number of longitudinal rows in a feed conveyor, which comprises forming each row of biscuits into a stack of superposed biscuits lying flat in a compartment of a hopper disposed beneath the delivery end of the feed conveyor and thereafter delivering biscuits in succession from the bottom ends of the compartments to one or more narrow conveyors, each carrying a single row of biscuits and extending transversely to the feed conveyor, characterised in that the biscuits are discharged from the end of the feed conveyor to the compartments of the hopper by means of a device which accelerates the leading biscuit in each row on the feed conveyor sufficiently to enable it to fall flat in the hopper without interference by the succeeding biscuit in the row.

The accelerating device may be a downwardly directed chute, on which the biscuits lie flat and having associated guides for maintaining the biscuits thereon in aligned rows. Alternatively, it may be a short conveyor travelling faster than the feed conveyor, which is effective to space the biscuits in each row sufficiently to ensure that the leading biscuit may fall flat in the hopper without interference by its successor.

The invention includes apparatus for handling biscuits or similar thin articles comprising a feed conveyor for feeding forward biscuits lying flat thereon in longitudinal rows, a hopper beneath the delivery end of the feed conveyor having compartments, each for receiving biscuits from one of the individual rows as a stack of superposed biscuits lying flat, an accelerating device for the biscuits between the feed conveyor and the hopper, e.g. a chute extending downwardly from the delivery end of the feed conveyor towards the hopper and on which the biscuits lie flat as they travel to the hopper and having associated guides for maintaining the biscuits thereon in aligned rows, at least one narrow conveyor disposed alongside the hopper and extending transversely to the chute and extractor mechanism for delivering biscuits in succession from the bottoms of the stacks in the hopper to form a single row of biscuits on each narrow conveyor.

Preferably the chute has an upwardly curved portion, at the end thereof adjacent the hopper, which serves to counteract the tendency of the biscuits to nose-dive off the end of the chute into the hoppers.

The extractor mechanism may include a reciprocating extractor common to all the compartments of the hopper. Alternatively it may comprise an individual reciprocating extractor for each compartment of the hopper, a feeler associated with each extractor for testing the number of biscuits present in its compartment and means controlled by each feeler for disabling its extractor when the number of biscuits in the compartment is less than a predetermined value.

Three alternative embodiments of biscuit handling apparatus according to the invention will now be described in detail, by way of example, with reference to the accompanying drawings, in which:

Fig. 2 is a corresponding plan view,

Fig. 3 is a diagrammatic longitudinal section showing the second embodiment,

Fig. 4 is a longitudinal section through the third embodiment, and

Fig. 5 is a section on the line V—V in Fig. 4.

Like reference numerals indicate like parts throughout the figures.

Figure 1:
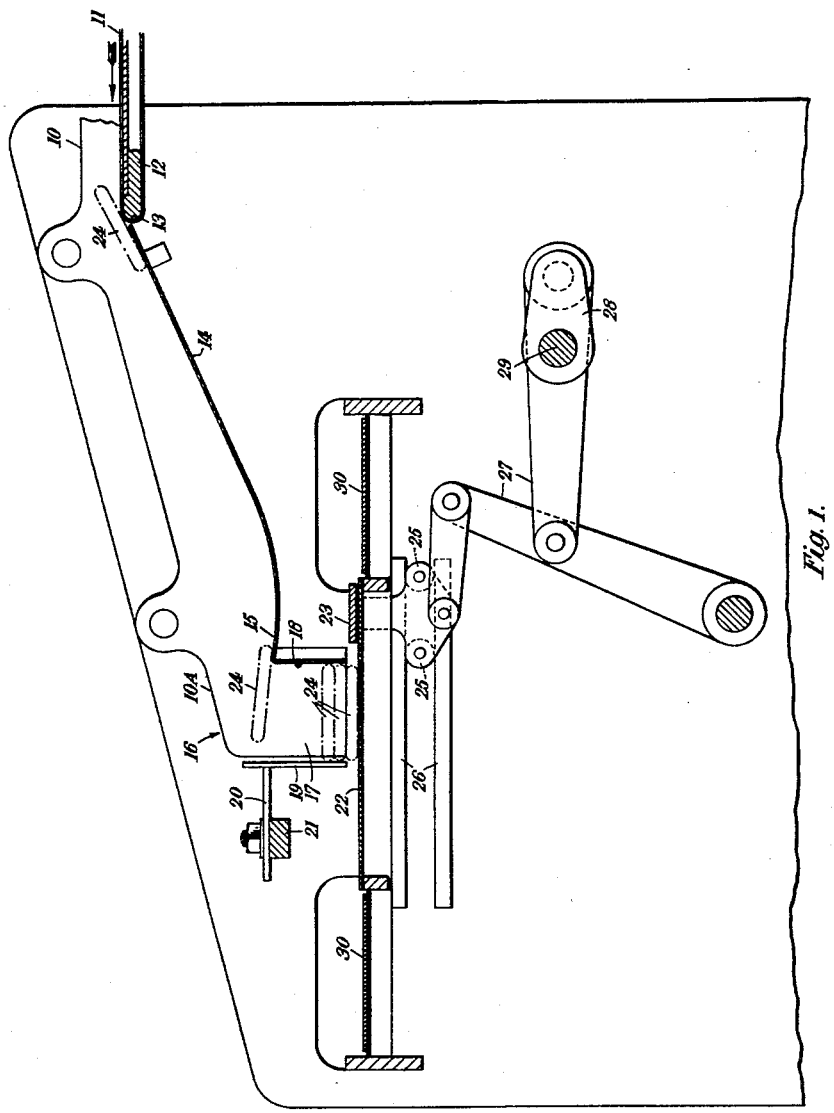
Fig. 1 is a longitudinal section through the first embodiment.

In the arrangement shown in Figs. 1 and 2, the biscuits from the cooling band of a baking plant are "rowed-up" in conventional fashion and carried from the bottom of the "rowing-up" chute (not shown) between guides 10, defining channels for the rows of biscuits, by means of a short feed conveyor constituted by a band 11. The band 11 passes over a plate 12, the end 13 of which forms in effect a "knife-edge" over which the biscuits are discharged to a polished metal chute 14 at first sloping downwards but terminating in the above-mentioned upwardly curving portion 15. Extension 10A of the guides 10 maintain the biscuits travelling down the chute 14 in aligned rows. The biscuits fall flat from the channels defined by the guides 10A into a hopper 16, having a plurality of compartments 17, one for each row.

Each compartment 17 is defined by a front wall 18 at the base of the chute, side walls constituted by the guides 10A and a rear wall constituted by the vertical face 19 of a T-shaped plate 20 adjustably mounted on a bar 21. The bottom of each compartment is defined by a table 22 common to all of them. The biscuits 24 are delivered by the chute 14 to each compartment 17 to form therein a stack of biscuits lying flat as shown in Fig. 1. As will be noted, the bottom edges of the front and rear walls 18, 19 of each compartment are clear of the table 22 by an amount sufficient to permit of extraction from the compartments 17 of single biscuits 24 by an extractor plate 23 common to all the compartments and arranged to oscillate across the table. The extractor plate 23 is guided by rollers 25 between guides 26 and is actuated by a linkage 27 from a crank 28 on a rotating shaft 29. The table 22 is flanked by narrow high speed conveyors 30 extending transversely to the chute, the bottom biscuits from the compartments being delivered alternately to these cross conveyors 30 by the extractor plate 23. Alternatively, the extractor plate can be arranged to be single acting and to deliver the bottom biscuits to a single cross conveyor only. Again, by staggering the extractor plate in plan view, it may be arranged to deliver the bottom biscuits to three or more cross conveyors.

For successful operation of this apparatus, it is necessary for a small reservoir of biscuits to be kept in each compartment of the hopper, and for the extractor plate 23 to remove biscuits from the bottom of each compartment at the same average rate as they arrive at the top. Should the rate of arrival exceed the rate of extraction, the compartments will, of course, became over-filled and cause a jam; should the reverse occur, the compartments will become empty. This latter condition gives rise to the danger that a biscuit may arrive and fall to the bottom of a compartment at a moment when the extractor plate is not in a favourable position, and biscuit breakage may result.

Where the biscuit making plant is such that the rows of biscuits are well maintained on the cooling conveyor, the biscuits will be distributed sufficiently uniformly between the compartments 17 of the hopper to permit of extraction of the bottom biscuits from all of the compartments simultaneously by an extractor plate 23 common to all of them as shown in Figs. 1 and 2. In other cases, however, and particularly in the case of round biscuits staggering the rows of biscuits is common and the distribution of biscuits among the compartments 17 of the hopper is haphazard. It is accordingly preferred in these cases to use a modified system in which an individual extractor is associated with each compartment and is prevented from operating unless a sufficient number of biscuits is present in the compartment.

One such modified system is shown diagrammatically in Fig. 3. In this case each compartment 17 of the hopper has an individual extractor 123 and an associated feeler 50. The feeler 50 oscillates cyclically so as to protrude at each cycle into the compartment 17 (at a given level) and then withdraw. If the biscuits have filled the compartment to the extent that the feeler 50 contacts one or more of them the extractor 123 is allowed to operate and extract a biscuit (or one biscuit in each direction if it is to be double acting) from the bottom of the compartment. If, however, the compartment 17 is insufficiently filled with biscuits to arrest the feeler 50, the extractor 123 is prevented from operating. The feeler 50 is pin-jointed at 31 to a rocking lever 32 which is connected at its other end 33 by means of a link 34 to a catch 35, pivoted on a fixed pivot 36 and urged by a spring 37 so as normally to restrain a lever 38 operating the extractor plate by engaging with a hook 39 on the lever 38. At an intermediate point 40 the rocking lever 32 is pivoted to the end of a cam lever 41, which is cyclically operated by a cam (not shown) so that the pin point 31 oscillates towards and away from the hopper 16.

The lever 38 is connected non-positively (e.g. through tension springs) to an operating cam (not shown) so that it remains stationary until the hook 39 is released. When the feeler 50 is prevented from travelling to its full extent into the compartment 17 by the presence of a biscuit 24, the rocking lever 32 will rock about its top centre 31 to move the link 34 towards the hopper and cause the catch 35 to pivot against its spring 17 to release the hook 39. When sufficient biscuits have been extracted from the compartment 17 to allow free passage to the feeler 50, the catch 35 will maintain its operative position on the forward stroke of the cam lever 41 and the extractor 123 will be prevented from operating.

In the arrangement shown in Figs. 4 and 5, each compartment has an individual extractor 223, which is of forked construction, is double acting and normally travels in the path AB so as to extract two biscuits 24 from its compartment 17 at each cycle, transferring one to each of the narrow transverse conveyors 30. When, however, the associated feeler 50 fails to detect biscuits in the compartment the extractor 223 is caused to move in an alternative inoperative path AC., in which its tip is below the table 22.

The extractor 223 is fixed to the end of a link 42, controlled by two linkages. One linkage comprises a lever 43 fixed to a shaft 44 which is oscillated by a lever 45, connected by a link 46 to a crank 47 on the end of a cam shaft 48. The other linkage comprises a link 49, pivoted to one end of a lever 51, pivoted to a shaft 52 and fixed to a cam lever 53 carrying a follower 54 coacting with a cam 55 on the cam shaft 48. A spring 56, tensioned between the cam lever 53 and a fixed point, constrains the follower 54 to follow the profile of the cam 55 and so rock the lever 51 to and fro about the shaft 52. The clockwise movement imparted to the lever 51 when the follower 54 leaves the high part of the cam 55 raises the link 49, thereby depressing the extractor 223 and causing it, as it is reciprocated by the lever 43, to follow the inoperative path AC.

The feeler 50 is mounted on one end of a rod 57 which is free to slide but not to rotate in guides 58, 59. A spring 60 maintains the other end of the rod 57 in contact with the upper end of a rocking lever 61, pivoted at 62 to a cam lever 63 which, in turn, is mounted on a fixed pivot 64. A spring 65 attached to the rocking lever 61 biases it counterclockwise about the pivot 62 into position to engage a stop 68 on the cam lever 63. The spring 65 also urges the cam lever 63 clockwise to maintain a follower 66 thereon in contact with a cam 67 on the cam shaft 48. The cam 67 periodically oscillates the cam lever 63, to cause the rocking lever 61 to move the rod 57 to the left, so moving the feeler 50 into the compartment 17.

If sufficient biscuits are present in the compartment 17 to arrest the forward movement of the feeler 50, the rocking lever 61 will be caused to rock clockwise about the pivot 62, so bringing a trip plate 69 on its lower end into position beneath a trip finger 70 fixed to the cam lever 53. As the result, when the follower 54 rides off the high part of the cam 55, the spring 56 is unable to rock the lever 51 clockwise to lift the right hand end of the link 42. The extractor 223 therefore moves in the path AB instead of in the path AC and is operative to extract biscuits from the compartment 17. When, however, at any cycle of operation the feeler 50 does not encounter a biscuit it is able to perform its full stroke and the rocking lever 61 is not moved to position the trip plate 69 beneath the trip finger 70. The lever 51 is accordingly free to rock clockwise to cause the extractor 223 to travel in its lower inoperative path AC.

What I claim as my invention and desire to secure by Letters Patent is:

1. In apparatus for handling biscuits or like thin articles, the combination with a wide feed conveyor for accommodating a plurality of longitudinal rows of biscuits located side by side on said conveyor of a hopper beneath the delivery end of said feed conveyor, said hopper including a plurality of compartments, each for receiving biscuits from one of said longitudinal rows as a stack of superimposed biscuits lying flat, the bottoms of all of said compartments being situated at the same level, a device between the delivery end of the feed conveyor and the hopper for accelerating the leading biscuit in each row on the feed conveyor sufficiently to enable it to fall flat in the hopper without interference by the succeeding biscuit in the row, guides associated with said feed conveyor and said accelerating device for maintaining the biscuits in their respective rows, at least one narrow conveyor disposed alongside said hopper and extending transversely to said feed conveyor, an individual extractor for each compartment of the hopper, means for reciprocating said extractors horizontally to cause them to deliver at intervals the bottom biscuits in said compartments to said narrow conveyor to form thereon a single longitudinally extending row of biscuits, a feeler adjacent each compartment and situated at a level above the extractor, means for reciprocating the feelers towards and away from the compartments in timed relation with the reciprocatory movement of the extractors, and control mechanism constituted by a mechanical interlinkage between each feeler and its extractor, said mechanism being controlled by the feeler to render its extractor ineffective to remove a biscuit from its compartment when said feeler is free to move into its compartment and to permit of effective reciprocation of said extractor to deliver a biscuit when movement of the feeler into the compartment is obstructed by biscuits in said compartment.

2. Apparatus as claimed in claim 1, wherein each extractor is reciprocable in alternative paths, one in which it is effective to extract biscuits and the other in which it moves below the associated stack of biscuits, and whereas mechanism controlled by the associated feeler is coupled to the feeler and effective to determine the path of movement of the extractor.

3. Apparatus as claimed in claim 2, in which each extractor is mounted on two linkages which normally cooperate to move the extractor in its inoperative path and wherein said feeler-controlled mechanism is a trip mechanism actuated by the feeler when it detects biscuits to disable one of said linkages and thereby cause the feeler to move in its operative path.

4. In apparatus for handling biscuits or like thin articles, the combination with a wide feed conveyor for accommodating a plurality of longitudinal rows of biscuits located side by side on said conveyor, of a hopper beneath the delivery end of said feed conveyor, said hopper including a plurality of compartments, each for receiving biscuits from one of said longitudinal rows as a stack of superimposed biscuits lying flat, a flat table constituting a common bottom for all the compartments, a device between the delivery end of the feed conveyor and the hopper for accelerating the leading biscuit in each row on the feed conveyor sufficiently to enable it to fall flat in the hopper without interference by the succeeding biscuit in the row, guides associated with said feed conveyor and said accelerating device for maintaining the biscuits in their respective rows, at least one narrow conveyor disposed alongside said hopper and extending transversely to said feed conveyor, a plurality of extractors one for each of said compartments, means for periodically moving each said extractor in either of two alternative paths, in one of which it projects upwardly through slots in said table and is effective to deliver the bottom biscuit in the associated compartment to said narrow conveyor and in the other of which it is situated below said table, a feeler associated with each extractor and compartment, means for moving feelers towards the compartments prior to movement of said extractors, and means controlled by each feeler for permitting its extractor to move in said first-mentioned path only when the associated compartment contains a predetermined number of biscuits.

5. The combination, with a hopper for containing a stack of biscuits or like thin articles lying flat, of a conveyor located alongside the hopper, an extractor, means for periodically reciprocating said extractor in either of two alternative paths, in the first of which paths said extractor operates to deliver the bottom biscuit in the hopper to said conveyor and in the second of which paths said extractor moves beneath the hopper and is ineffective to discharge a biscuit therefrom, a feeler located at a level higher than the extractor, means for periodically moving said feeler towards the hopper to test the number of biscuits in said hopper, and means controlled by the feeler for causing movement of said extractor in said first path when movement of the feeler into the hopper is obstructed by biscuits in said hopper and otherwise causing movement of said extractor in said second path.

6. Apparatus as claimed in claim 5, wherein said extractor is mounted on two linkages which are normally both effective to move said extractor in said second path and wherein said feeler-controlled means comprises a trip mechanism which operates, when movement of said feeler is obstructed by biscuits in the hopper, to disable one of said linkages and thereby cause movement of said extractor in said first path.

References Cited in the file of this patent

UNITED STATES PATENTS

| 1,801,997 | Boettcher | Apr. 21, 1931 |
| 2,253,482 | Forsthoefel et al. | Aug. 19, 1941 |
| 2,530,698 | Hogeberg | Nov. 21, 1950 |
| 2,551,199 | Basus | May 1, 1951 |
| 2,576,366 | Smith | Nov. 27, 1951 |
| 2,640,605 | Chatterton | June 2, 1953 |

FOREIGN PATENTS

| 230,999 | Switzerland | May 16, 1944 |